United States Patent
Shoshany et al.

(10) Patent No.: US 6,908,677 B2
(45) Date of Patent: Jun. 21, 2005

(54) WOOD PRODUCT AND METHOD THEREFOR

(76) Inventors: Haggai Shoshany, P.O. Box 400, Kfar Tavor 15241 (IL); Amnon Shoshani, 16 Haim Street, Tel Aviv 69407 (IL)

( * ) Notice: Subject to any disclaimer, the term of this patent is extended or adjusted under 35 U.S.C. 154(b) by 0 days.

(21) Appl. No.: 10/453,597

(22) Filed: Jun. 4, 2003

(65) Prior Publication Data

US 2004/0247919 A1 Dec. 9, 2004

(51) Int. Cl.[7] ............................................. B32B 5/16
(52) U.S. Cl. ..................... 428/403; 428/407; 428/327; 156/62.2; 156/284
(58) Field of Search ................... 428/403, 407, 428/327; 156/62.2, 284

(56) References Cited

U.S. PATENT DOCUMENTS

| | | | |
|---|---|---|---|
| 2,468,266 A | 4/1949 | Lyons | |
| 3,252,927 A | 5/1966 | Hoffmann | |
| 4,013,804 A | 3/1977 | Gruetzman | |
| 4,241,133 A | * 12/1980 | Lund et al. | 428/326 |
| 5,047,275 A | 9/1991 | Chiu | |
| 5,897,697 A | 4/1999 | Sorenson | |
| 6,231,656 B1 | * 5/2001 | Dekerf et al. | 106/38.25 |
| 6,406,786 B1 | * 6/2002 | Stofko | 428/327 |
| 6,569,540 B1 | * 5/2003 | Preston et al. | 428/537.1 |

FOREIGN PATENT DOCUMENTS

| GB | 2089358 A | 6/1982 |
|---|---|---|
| WO | WO 98/31763 A | 7/1998 |
| WO | WO 01/85877 A | 11/2001 |

* cited by examiner

*Primary Examiner*—Leszek Kiliman
(74) *Attorney, Agent, or Firm*—Dekel Patent Ltd.; David Klein

(57) ABSTRACT

A method comprising adding a suspension of a wood-property-enhancing substance to a wood product precursor. The suspension may be added to the wood product precursor in a production line prior to making a finished wood product. The suspension may be manufactured at a site where the wood product precursor is produced. A finished wood product may be made from the wood product precursor. An article is also described comprising a finished wood product made by adding a suspension of a wood-property-enhancing substance to a wood product precursor.

16 Claims, 1 Drawing Sheet

WOOD PRODUCT AND METHOD THEREFOR

FIELD OF THE INVENTION

The present invention relates generally to wood products, and particularly to imparting properties to wood products, such as with the addition of a suspension, such as but not limited to, a wax suspension, into the production line of the wood product.

BACKGROUND OF THE INVENTION

Wood and wood composite products are well known. Wood composites are in widespread use in furniture and other consumer products. Some examples of specific wood composite products are particleboard, medium density fiberboard (MDF), and oriented strandboard (OSB).

Particleboard is formed by binding small wood flakes with an adhesive, then rolling or molding a billet or sheet of the treated flakes to form a board, beam, or other product form. Randomly oriented particleboard has different mechanical properties from ordinary sawn timber wood. Wood exhibits directional mechanical properties, owing to the natural alignment of long wood fibers along the direction of the tree trunk. Its tensile strength and elastic modulus, for example, are much greater in directions parallel to the grain direction than in the cross-grain direction. In contrast, the random alignment of wood flakes in particleboard and some other wood composite products results in substantially isotropic mechanical properties. But these isotropic properties are comparable to the relatively poor mechanical properties possessed by wood in directions perpendicular to the grain. In general, particleboard has exhibited a poor ability to sustain bending loads, as compared with natural timber, and thus has largely been unsatisfactory as a structural beam.

Medium density fiberboard is made similarly to particleboard, except that the flakes commonly are smaller, and are refined to release fibers before forming sheets.

Wood composite products have been developed in which wood flakes or strands are oriented in a single direction, to provide a structure more like natural wood. One example is oriented strandboard (OSB). Such products possess relatively improved strength in directions parallel to the direction of alignment.

More complex wood composite products have been developed, which have several consolidated strata in which the particles are aligned in different directions. For example, a three-stratum beam or sheet or other composite article can be made in which the outer or facing layers have their orientation parallel to the longest dimension of the composite, as in conventional wood. The interior layer has its fiber orientation perpendicular to the longest dimension of the composite. Three-stratum boards are also known in which large flakes make up the center layer and smaller flakes make up the outer layers.

Reconstituted wood particle boards may be made by various processes. One example includes pouring a slurry consisting of wood particles, water, and discontinuous high strength, high modulus fibers onto a continuously moving screen. The water is drained off leaving a wet wood particle mat on the screen. The interlaced wood particle mat is then oven dried producing a continuous sheet of fiberboard. Hot steam jets can be used to increase the density of the material to produce wet-process hardboard. This process may be used to produce hardboard, and low, medium and high density fiberboard.

Another method includes mixing sawdust, wood shavings, wood waste or veneer with an adhesive containing the discontinuous fibers and compressing the mixture under heated platens. Different profiles of wood material can be used through the depth. For example, saw dust or small wood waste materials can be placed between wood wafers and pressed under heat. Organizing the layup through the thickness allows for increased engineering properties including strength and stiffness. Molds can be used to produce complex shapes. Plywood, oriented strandboard, waferboard, particleboard, medium and high density fiberboard, and laminated veneer lumber may be made by this process.

Yet another method for manufacturing a reconstituted wood structural member comprises combining wood particles, strands, or veneers with a binder mixed with the discontinuous fibers and forcing the combination through a die under heat and pressure to produce a continuous board. The finished board can be cut to particular lengths and it can intricate profiles determined by the cross section of the die. This process may be used to produce parallel strand lumber, particle board, and variations of laminated veneered lumber.

Reconstituted wood products may also be made by combining wood chips or other type of wood waste with a wax or other type of binder with the discontinuous fibers and subjecting the combination to heat and pressure on the hot press. This dried processed board is similar to the wet processed board except that the mechanical properties are not as great due to the decreased fiber interlocking. Hardboard; high density hardboard; fiberboard; and low, medium, and high density fiberboard may be made from this process.

There are many different problems associated with wood and wood composite products. One problem is that they are dimensionally unstable after they are made. Even a stratified board with layers oriented in different directions will grow or shrink substantially in response to environmental moisture and weather conditions. This property has limited the value of wood composite members of substantial size for use in construction products.

The problem of dimensional instability can be addressed by increasing the adhesive content of the product, but at a substantially greater cost, as the adhesive composition is expensive. Another way known in the prior art to improve the dimensional moisture stability of the resulting board product is to apply a suitable wax in emulsion or molten form to the wood particle mix at the binder blender station or elsewhere in the fabrication process.

Anther problem is that of preservation against environmental factors, such as but not limited to, termites, ants (for example, carpenter ants) and other wood-destroying insects or fungi, soft rot, and mold fungi. Examples of wood-destroying fungi and soft rot and mold fungi are: *Gloeophyllum trabeum, Trametes versicolor, Paxillus panuoides, Condrostereum purpurescens, Heterobasidium annosum, Bispora effusa, Stachybotrys atra, Chaetomium globosum, Trichoderma viride, Aspergillus niger, Hormiscium spec.,* and *Stemphylium spec.* Wood products are preserved using amounts of wood preservative compounds known or believed to be effective against one or more of these organisms.

Yet another problem in the art has been how to effectively incorporate a water-borne wood preservative in a wood composite product, so the preservative compounds reach the interior of the product, without also incorporating a significant amount of additional water in the product. Any excess incorporated water must be dried out, using additional energy, time, equipment, factory space, and thus money. Another problem in the art is how to incorporate a waterborne preservative system into wood composite products without causing a negative impact on panel structural properties.

U.S. Pat. No. 4,241,133 to Lund, et al. describes a wood composite containing about 5 to 12% weight of a binder and, optionally, additives, such as wax, for waterproofing and preservatives for protection against decay fungi and insects. According to Lund, dried, classified particles are introduced into a conventional blender where predetermined amounts of a binder, and optionally a wax, a preservative and other additives are applied to the particles as they are tumbled or agitated in the blender.

U.S. Pat. No. 6,569,540 to Preston et al. describes a wood composite including wood particles, a binder, at least one wood stabilizer, and optionally other ingredients. The wood stabilizer is present in an amount effective to reduce the swelling value of the wood composite to less than that of an analogous wood composite not treated with the wood stabilizer. The wood composite may be made by applying a wood stabilizer to green wood particles, preferably without an intervening drying step. While or after applying the stabilizer, a water repellant material (e.g., a wax emulsion) is applied to the wood particles. The treated wood particles are then formed into a wood composite.

SUMMARY OF THE INVENTION

The present invention seeks to provide an improved wood product and process therefor, by adding a suspension, such as but not limited to, a wax suspension, into the wood product at some point of the manufacturing process, wherein the suspension is used instead of an emulsion.

It is important to define clearly the difference between an emulsion and a suspension. An emulsion is defined as a dispersion of one liquid in a second immiscible liquid. One well-known example of an emulsion is milk; another is certain kinds of paint. A suspension, on the other hand, is defined as a dispersion of fine solid or liquid particles in a fluid (liquid or gas), the particles being supported by buoyancy.

Adding a suspension instead of an emulsion to the wood product may provide several advantages. Emulsions have to be stored at the site where the wood product is produced, and have a limited shelf life. The manufacture of emulsions uses a lot of energy and is relatively costly. In contrast, the raw materials for making the suspension are much cheaper and are much more stable. Production of certain water repellent suspensions requires heat. The suspension may be manufactured at the site where the wood product is produced. The excess heat of the wood production process may be used as part of the manufacturing process of the suspension. The heat source may be the excess heat of the production line in general, or the excess steam of the drying process in particular. Making the suspension at the site where the wood product is produced, and introducing the suspension on-line to the wood product, may provide significant savings in energy, storage, manpower, etc.

Due to its online production, the suspension is not sensitive to storage and/or storage conditions, such as but not limited to, excessive mechanical shear, pumping, excessively low or high ambient temperature, storage agitation, crust formation, particles agglomeration, and the like.

The suspension may be used to impart a wide variety of characteristics to the wood product, such as but not limited to, water repellence or resistance, water absorption control, sizing control, dimensional stability, thickness swell control, edge sealing, density control, mechanical strength control, and wood preservation. "Preservation" encompasses any treatment with a preservative which reduces the rate of deterioration of the wood, compared to the rate of deterioration of an analogous wood lacking the preservative.

In one embodiment of the present invention, the wood product is made by adding a suspension of a hydrophobic (that is, water repelling or resisting, the terms being used interchangeably) substance to the wood product, such as but not limited to, paraffin, wax and the like. The term "adding" encompasses mixing, coating, dissolving, pouring, or any other action to make the suspension part of the finished wood product.

The suspension may be added to any wood or engineered wood product. The term "wood" encompasses, but is not limited to, wood, HW (hard wood) CW (compressed wood), plywood, PB (particle board), FB (fiber board), LDF, MDF, HDF (low, medium, high density fiber board), OSB (oriented strandboard), PSL (parallel strand lumber), WB (wafer board), HB (hard board), DPH (dry process hardboard), WPH (wet process hardboard), and IB (insulating board) and any other engineered wood, wood composite, wood particle, reconstituted wood product or wood-type products. The term "wood particles" encompasses, but is not limited to, wood strands, chips, flakes, refined chips or flakes, fibers, webs of splintered wood formed by twisting or crushing billets of wood, or other forms of wood particles.

The suspension may be added to the wood in a variety of manners. For example, the suspension may be added to a slurry comprising the wood product, or may be added to a liquid feed stream that is fed to the wood product slurry. The suspension may be added as a wetting agent during or after production of the wood product. As another example, the suspension may be added as a surface treatment to make the finished wood product.

The suspension may be applied as a single additive, in combination with other additives, or as a carrier for other additives.

There is thus provided in accordance with an embodiment of the present invention a method comprising adding a suspension of a wood-property-enhancing substance, such as but not limited to, a wax suspension, to a wood product precursor. The suspension may be added to the wood product precursor in a production line prior to making a finished wood product. The suspension may be manufactured at a site where the wood product precursor is produced. A finished wood product may be made from the wood product precursor.

In accordance with an embodiment of the present invention excess heat of producing the wood product precursor is used as part of manufacturing the suspension.

Further in accordance with an embodiment of the present invention the method comprises storing the wood-property-enhancing substance in a first storage container, storing a liquid in a second storage container, and forming the suspension by dispersing the wood-property-enhancing substance in the liquid in a mixing device. The suspension may be added directly from the mixing device to the wood product precursor. Alternatively, the suspension may be fed from the mixing device to an auxiliary mixing device, and the suspension is added from the auxiliary mixing device to the wood product precursor.

Still further in accordance with an embodiment of the present invention the method comprises controlling flow of the suspension to the wood product precursor with a control feeder valve.

In accordance with an embodiment of the present invention the method comprises producing and adding the suspension to the wood product precursor in a production line, wherein the production line and the control feeder valve operate in a closed control loop.

Further in accordance with an embodiment of the present invention the suspension of the wood-property-enhancing substance enhances at least one of the following properties: water repellence, water resistance, water absorption control, sizing control, dimensional stability, thickness swell control, edge sealing, density control, mechanical strength control, and wood preservation.

There is also provided in accordance with an embodiment of the present invention an article comprising a finished wood product made by adding a suspension of a wood-property-enhancing substance to a wood product precursor.

BRIEF DESCRIPTION OF THE DRAWINGS

The present invention will be understood and appreciated more fully from the following detailed description taken in conjunction with the drawing in which.

DETAILED DESCRIPTION OF THE PREFERRED EMBODIMENT

Figure 1:
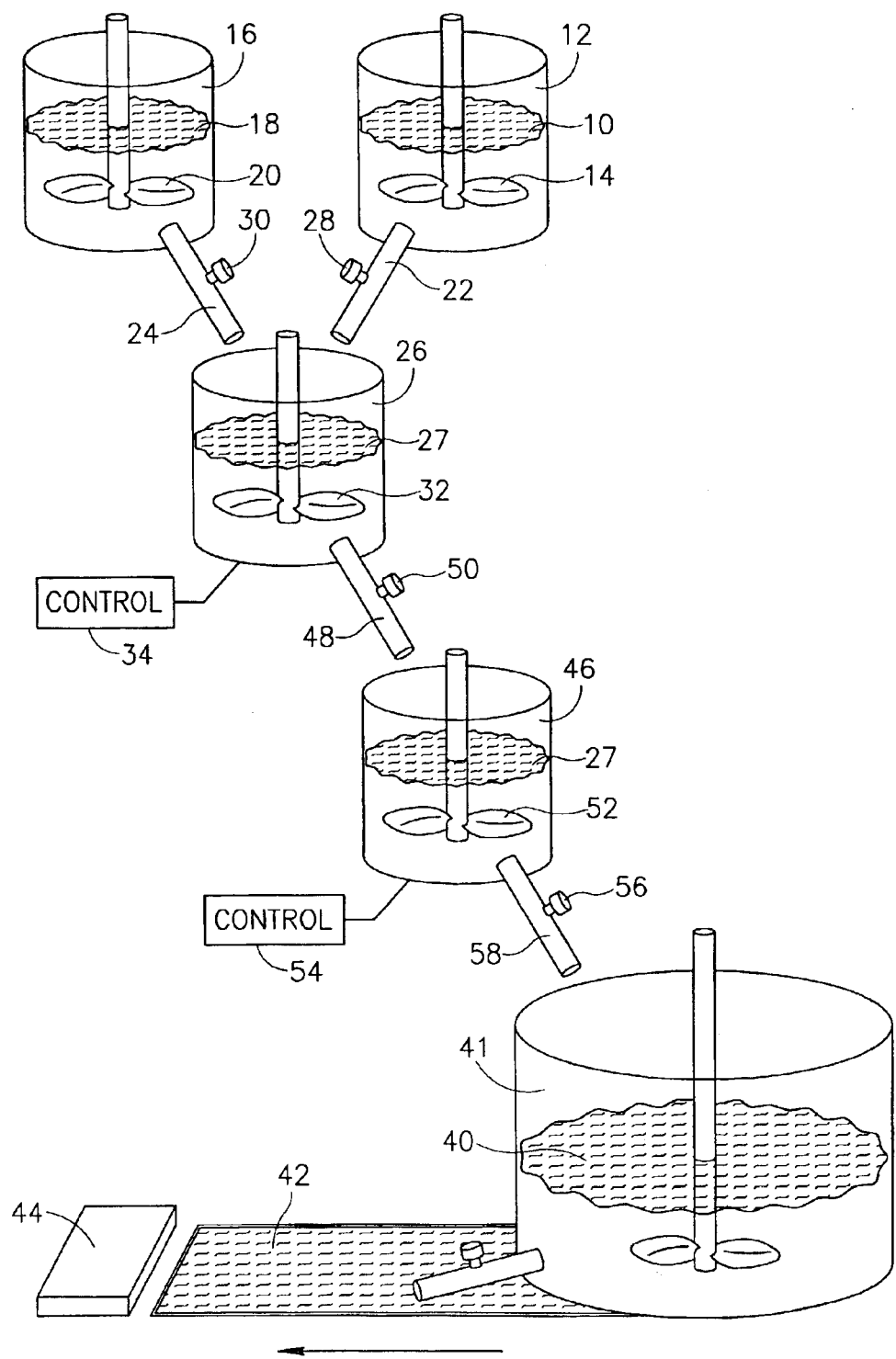
FIG. 1 is a simplified block diagram of a method and system for making a wood product, in accordance with an embodiment of the present invention.

Reference is now made to FIG. 1, which illustrates a method and system for making a wood product, in accordance with an embodiment of the present invention.

A wood-property-enhancing substance 10, such as but not limited to, a binder, a preservative, a resin, a hydrophobic substance, and the like or any combination thereof, may be stored in a storage container 12. In accordance with one embodiment of the present invention, the wood-property-enhancing substance 10 may comprise a wax, such as but not limited to, paraffin, paraffin wax, montan wax, candelilla wax, carnauba wax, beeswax, polyethylene wax, maleated hydrocarbons and others. "Wood-property-enhancing substance" encompasses any substance that enhances a mechanical, biological, physical, chemical, electrical or other property of wood, compared to the property of an analogous wood lacking the wood-property-enhancing substance. The term "enhance" is used to mean obtaining a desired modification in the property of the wood, encompassing both increasing and decreasing the magnitude of the property, depending on the application and desired end result.

Wood-property-enhancing substance 10 may be in the form of liquid, particles, flakes, pellets and other shapes, of any size. Storage container 12 may comprise a mixer 14. Dispersing aids (not shown) may be added to wood-property-enhancing substance 10 in storage container 12. Mixer 14 may be used to reduce wood-property-enhancing substance 10 to particles of any desired size. Provision may be made for controlling the temperature of the contents of storage container 12, such as, but not limited to, to a temperature range of 60–98° C.

Another storage container 16 may be provided for storing therein a liquid 18, such as but not limited to, water, which will be used to disperse therein wood-property-enhancing substance 10 to form a suspension. Storage container 16 may also comprise a mixer 20. Dispersing aids (not shown) may be added to liquid 18 in container 16. Provision may be made for controlling the temperature of the contents of storage container 16, such as, but not limited to, to a temperature range of 60–98° C.

The contents, or any portion thereof, of storage containers 12 and 16 may be fed via tubing 22 and 24, respectively, to a batch mixing device 26, where wood-property-enhancing substance 10 is dispersed in liquid 18 to form a suspension 27. Control valves 28 and 30, respectively, may control the flow of material from storage containers 12 and 16 to batch mixing device 26. Batch mixing device 26 may comprise a mixer 32, which may be any suitable dispersing mixer, such as but not limited to, a propeller, a stirrer, or dissolver moving at any suitable rate to form or maintain suspension 27. A control unit 34 may be provided that controls operation of batch mixing device 26, such as but not limited to, the weight or volume of the substances being mixed, particle size, the pressure or temperature of batch mixing device 26, and the time duration of mixing. Dispersing aids (not shown) may be added to the suspension in storage container 26.

Suspension 27 may be added directly, if desired, from batch mixing device 26 to a wood product precursor 42 on a production line for making a final wood product 44. The wood product precursor 42 may comprise, without limitation, a slurry (e.g., for making a reconstituted wood product), wood particles or wood boards (e.g., suspension 27 may be added as a surface treatment to a wood board to make the finished wood product 44). The term "wood product precursor" encompasses any form of the wood product ready for adding thereto the wood-property-enhancing substance 10 prior to the final manufactured form of the wood product 44. The final wood product 44 may include, without limitation, sheets, boards, beams, or other any other product form.

Suspension 27 may alternatively flow from batch mixing device 26 to a mixer 41, where suspension 27 is further mixed with other additives to make a suspension 40. Mixer 41 may comprise any suitable dispersing mixer, such as but not limited to, a propeller, stirrer, or dissolver moving at any suitable rate to form or maintain suspension 40. A control process feeder valve 50 may control the flow of suspension 27 to mixer 41.

As another alternative, suspension 27 may first flow from batch mixing device 26 to an auxiliary mixing device 46 via tubing 48. A control batch feeder valve 50 may control the flow of material from batch mixing device 26 to auxiliary mixing device 46. Auxiliary mixing device 46 may also comprise a mixer 52, which may be any suitable dispersing mixer, such as but not limited to, a propeller, stirrer, or dissolver moving at any suitable rate to form or maintain suspension 27. A control unit 54 may be provided that controls operation of auxiliary mixing device 46, such as but not limited to, the weight or volume of the substances being mixed, the pressure or temperature of auxiliary mixing device 46, and the time duration of mixing. A control process feeder valve 56 may control the flow of suspension 27, via tubing 58, to mixer 41. The production line and control process feeder valves 50 and 56 may operate in a closed control loop, wherein the rate of the production line automatically controls the production and feeding of suspension 27 to mixer 41.

In general, the suspension comprising wood-property-enhancing substance 10 may be added by itself to the wood product precursor 42, or other substances may be added to the suspension before its addition into the wood product precursor 42, or suspension 27 may be added to other components before adding to the wood product precursor 42.

It is noted that any of the mixing devices (e.g., "batch" or "auxiliary") may comprise provision for mixing discrete batches or continuous mixing of substances. It is further noted that the devices and equipment used in the above-described process are exemplary only, and the present invention is not limited to these devices or equipment.

The addition of suspension 27 or 40 may enhance properties of the final wood product 44. Examples of properties that may be enhanced by the wood-property-enhancing substance 10 in suspension 27 or 40 include, but are not limited to, water repellence or resistance, water absorption control, sizing control, dimensional stability, thickness swell control, edge sealing, density control, mechanical strength control, and wood preservation and any combination thereof.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A method comprising:
    improving a property of a wood product precursor by adding a suspension of wax suspended in water to a slurry comprising said wood product precursor in a production line prior to making a finished wood product, wherein said property comprises at least one of the following: water repellence, water resistance, water absorption control, sizing control, dimensional stability, thickness swell control, edge sealing, density control, mechanical strength control, and wood preservation.

2. The method according to claim 1, wherein said suspension is manufactured at a site where the wood product precursor is produced.

3. The method according to claim 1, wherein said wax comprises at least one of paraffin, paraffin wax, montan wax, candelilla wax, carnauba wax, beeswax, polyethylene wax, and maleated hydrocarbons.

4. The method according to claim 1, wherein excess heat of producing said wood product precursor is used as part of manufacturing said suspension.

5. The method according to claim 1, further comprising storing said suspension of wax suspended in water in a first storage container, storing a liquid in a second storage container, and forming said suspension by dispersing said suspension of wax suspended in water in said liquid in a mixing device.

6. The method according to claim 5, wherein said suspension is added directly from said mixing device to said wood product precursor.

7. The method according to claim 5, wherein said suspension is fed from said mixing device to an auxiliary mixing device, and said suspension is added from said auxiliary mixing device to said wood product precursor.

8. The method according to claim 6, further comprising controlling flow of said suspension to said wood product precursor with a control feeder valve.

9. The method according to claim 7, further comprising controlling flow of said suspension to said wood product precursor with a control feeder valve.

10. The method according to claim 8, comprising producing and adding said suspension to said wood product precursor in a production line, wherein said production line and said control feeder valve operate in a closed control loop.

11. The method according to claim 9, comprising producing and adding said suspension to said wood product precursor in a production line, wherein said production line and said control feeder valve operate in a closed control loop.

12. The method according to claim 1, further comprising forming a finished wood product from said wood product precursor.

13. An article comprising:
    a finished wood product made by adding a suspension of wax suspended in water to a wood product precursor, said suspension improving a property of said wood product precursor, wherein said property comprises at least one of the following: water repellence, water resistance, water absorption control, sizing control, dimensional stability, thickness swell control, edge sealing, density control, mechanical strength control, and wood preservation.

14. The article according to claim 13, wherein said suspension is added to said wood product precursor in a production line prior making said finished wood product.

15. The article according to claim 13, wherein said suspension is manufactured at a site where the wood product precursor is produced.

16. The article according to claim 13, wherein said wax comprises at least one of paraffin, paraffin wax, montan wax, candelilla wax, carnauba wax, beeswax, polyethylene wax, and maleated hydrocarbons.

* * * * *